(12) United States Patent
Prentice et al.

(10) Patent No.: US 6,397,042 B1
(45) Date of Patent: May 28, 2002

(54) SELF TEST OF AN ELECTRONIC DEVICE

(75) Inventors: Richard M. Prentice, Wylie; Martin J. Izzard, Dallas, both of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/260,600

(22) Filed: Mar. 2, 1999

Related U.S. Application Data

(60) Provisional application No. 60/077,169, filed on Mar. 6, 1998, and provisional application No. 60/090,495, filed on Jun. 24, 1998.

(51) Int. Cl.[7] .............................. H04Q 7/20; H03D 3/24
(52) U.S. Cl. ..................... 455/67.4; 455/67.1; 455/115; 455/226.1; 375/355; 375/376
(58) Field of Search .................... 455/423, 424, 455/425, 67.1, 67.4, 115, 226.1, 260, 73; 375/370, 371, 226, 221, 376, 355; 370/249; 708/313; 327/141, 147, 156

(56) References Cited

U.S. PATENT DOCUMENTS

| | | | |
|---|---|---|---|
| 4,415,770 A | * 11/1983 | Kai et al. ................ | 379/32 |
| 5,448,616 A | * 9/1995 | Kaewell, Jr. et al. ......... | 379/5 |
| 5,742,589 A | * 4/1998 | Murata ................... | 370/249 |
| 5,793,822 A | * 8/1998 | Anderson et al. .......... | 375/371 |
| 5,835,850 A | * 11/1998 | Kumar ................... | 455/67.4 |
| 5,953,372 A | * 9/1999 | Virzi .................... | 375/224 |
| 6,188,892 B1 | * 2/2001 | Krishnamurthi et al. ..... | 455/422 |

OTHER PUBLICATIONS

Texas Instruments, "SN75FC1000 1–Gigabit Fibre Channel Transceiver", Product Preview, Aug. 1996, Revised Dec. 1996, pp. 1–14.

* cited by examiner

Primary Examiner—Edward F. Urban
Assistant Examiner—Temica M. Davis
(74) Attorney, Agent, or Firm—J. Dennis Moore; W. James Brady, III; Frederick J. Telecky, Jr.

(57) ABSTRACT

The present invention provides for improved loopback testing of an electronic communications device. The electronic communications device (50) includes a transmit serializer (16), a transmit output buffer (13), a first phase interpolator (52), a phase locked loop (42), a second phase interpolator (44), a receive deserializer (18), a receive input buffer (15), and phase adjust logic (46). The PLL (42) generates a timing signal in accordance with a reference clock signal (43). In one mode of operation, the transmit serializer (16) transmits data for output through the transmit output buffer (13) in accordance with the timing signal generated by the PLL (42). In another mode of operation, the phase interpolator (52) accepts as input the timing signal generated by the PLL (42). The phase interpolator (52) then generates an altered timing signal which the transmit serializer (16) uses to transmits data for output through the transmit output buffer (13) asynchronously from the timing signal of the receive deserializer (18).

3 Claims, 2 Drawing Sheets

SELF TEST OF AN ELECTRONIC DEVICE

This application claims priority under 35 USC §119(e)(1) of provisional application No. 60/077,169, filed Mar. 6, 1998, and provisional application No. 60/090,495, filed Jun. 24, 1998.

FIELD OF THE INVENTION

The present invention relates generally to testing of electronic communications devices and more particularly to loopback testing of an electronic communications device.

BACKGROUND OF THE INVENTION

Testing of certain electronic communications devices, such as a high speed transceiver, is a problem for production. The data rate of, for example, a fiber channel transceiver chip (or similar device) is too fast for direct testing by means of commercially available production testers. For this reason, a "loopback" function is added to a transceiver.

Typically, the loopback function connects the transmit output of the transceiver back around to the receiver input of the transceiver internally (i.e., by bypassing the driver and receiver buffers). In this manner, data can be sent to the transmit function and back to determine whether the receive function has received the same data as was transmitted. If a string of random or pseudo random data is sent, this testing mechanism further provides a functional test of most logic except for the high speed I/O pins. If the high speed I/O pins are connected to each other to form a loopback external to the device, then more of the device is tested.

One problem with loopback, however, is that it does not mimic actual system operation very well. Loopback forces the transmit and receive functions to be synchronous and to operate at exactly the same baud rate. In an actual system, the receive data stream is asynchronous to the transmit stream and at a slightly different baud rate. Thus, if the device under test has a problem with handling asynchronous or frequency offset data, loopback won't detect it. As an example, a device or design flaw in a device such as an SN75FC10001-gigabit fibre channel transceiver chip, a device made and sold by the assignee, Texas Instruments Incorporated, and described in datasheet SLLS255B dated August 1996, revised December 1996, herein incorporated by reference in it's entirety, that causes unwanted interactions between the transmit and receive functions will not be detected in a loopback test.

SUMMARY OF THE INVENTION

The present invention is an improved loopback testing method and system for an electronic communications device. The electronic communications device includes a receive function and a transmit function. A mechanism for asserting a frequency offset on the transmit function to perform tests of the receive function when the electronic communications device is in a testing mode is provided.

In one aspect of the present invention, the asserting means includes a transmit phase interpolator.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

American National Standards Institute ("ANSI") standard X3T11, the fiber channel ANSI standard specification, defines fall duplex transceiver operations where the two transceivers may be as much as 200 parts per million ("ppm") apart in reference frequency. The transmit and receive functions at a fiber channel node need not be a single monolithic device but if it is, it is called a transceiver. It is also known as a SERDES device, short for serializer/deserializer.

Figure 1:
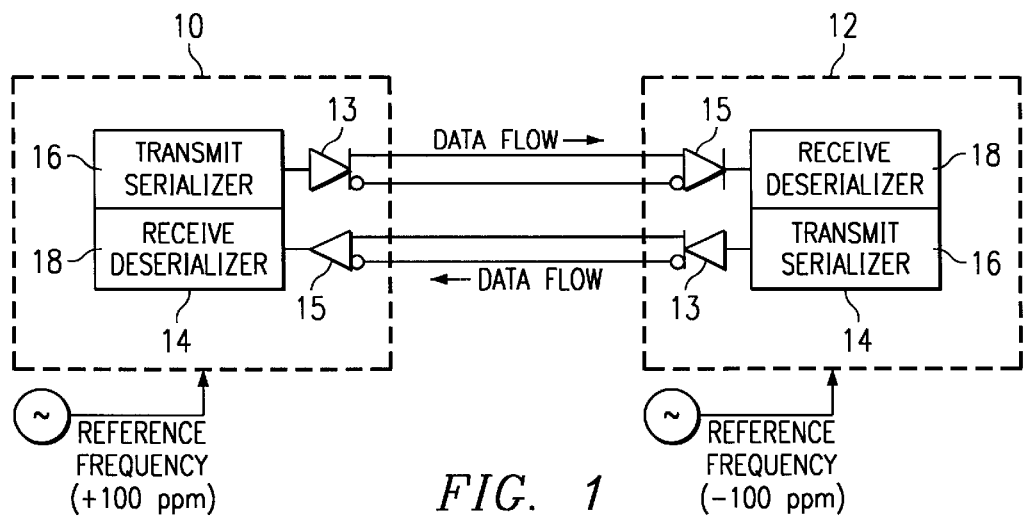
FIG. 1 illustrates an exemplary transmission system with two transceivers.

Such a system is as shown in FIG. 1 which includes two communications devices 10 and 12, each of which includes a transceiver 14. Each transceiver 14 includes a transmit serializer function 16 and a receive deserializer function 18. The two communications devices 10 and 12 are communicatively connected such that data flow from the transmit serializer function 16 in the transceiver 14 of the communications device 10 is received by the receive deserializer function 18 in the transceiver 14 of the communications device 12. By the same token, data flow from the transmit serializer function 16 in the transceiver 14 of the communications device 12 is received by the receive deserializer function 18 in the transceiver 14 of the communications device 10. Data flow into the receive deserializer functions 18 passes through receive buffer 15. Data flow out of the transmit serializer functions 16 passes through transmit buffer 13. Also shown in FIG. 1, the reference frequency of the communications device 10 (at+100 ppm) is 200 ppm from the reference frequency of the communications device 12 (at−100 ppm).

In such an application, the receive deserializer function 18 in one communications device 10 must lock to a data stream that is sourced by the transmit serializer function 16 of another communications device 12, and thus the incoming data stream may be at a slightly different (i.e., 200 ppm) frequency and of unknown phase relationship to the transmitted data stream.

Thus, if in a SERDES device a phase-locked loop ("PLL") is used in serializing the transmit data and another PLL is used to lock onto the receive data stream, the two PLL's will also be at a slightly different frequency.

Loopback testing is introduced to provide functional self test capabilities. Loopback may be either internal or external to the SERDES device.

Figure 2:
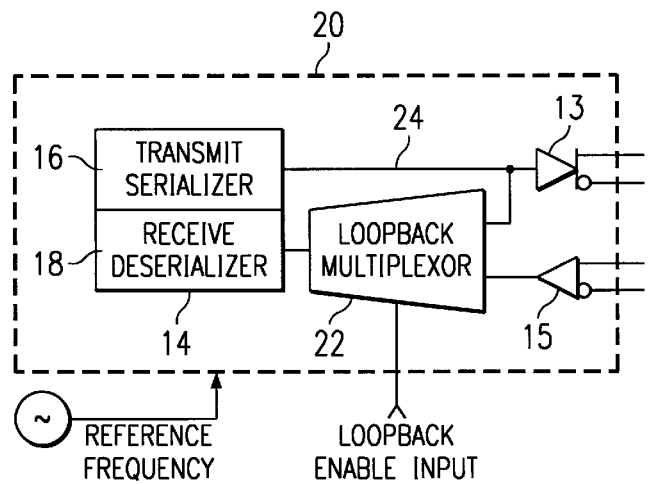
FIG. 2 shows an exemplary transceiver device with loopback self test capability.

In internal loopback testing, enabled by setting a loopback enable input HIGH, as illustrated in the exemplary SERDES device 20 shown in FIG. 2, the transmit data stream, at 24, from the transmit serializer 16 is internally routed to the receive deserializer function 18 through loopback multiplexor 22 forcing the receive deserializer function 18 to lock to the transmit serializer function 16. Then, any data supplied to the transmit serializer function 16 (such as a pseudo random binary sequence ("PRBS")) is recovered from the receive deserializer function 18. If the data matches, the exemplary SERDES device 20 is considered to be functional. Of course, if either the transmit buffer 13 or the receive buffer 15 is defective, the internal loopback testing function won't detect it.

Figure 3:
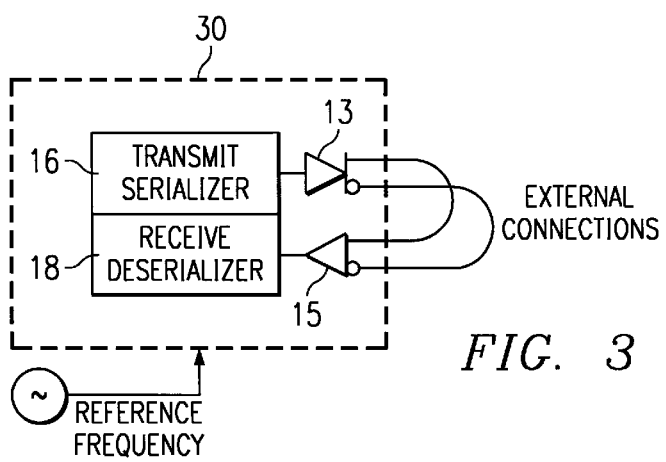
FIG. 3 depicts an exemplary transceiver device with external loopback connections.

FIG. 3 illustrates an exemplary SERDES device 30 in which an external loopback function is implemented by externally connecting the data flow from the transmit serializer function 16 of the exemplary SERDES device 30 to the receive deserializer function 18 of exemplary SERDES device 30. The external loopback function is employed to overcome the limitations associated with the use of the internal loopback function as discussed hereinabove.

Again, the problem with loopback testing, whether internal or external, is that it does not mimic the system application. Forcing the receive circuitry to lock to the same frequency as the transmit circuitry is artificial and does not represent the normal mode of operation. If there is any unwanted interaction between the operation of the transmit circuitry and receive circuitry, this interaction is not detected or observed during loopback testing.

In a dual PLL design, such unwanted interaction could be caused by a noise coupling between the analog components of the two PLLs. One unwanted interaction in this case could be a faulty frequency comparator between the transmit and receive frequencies resulting in a device that only works correctly if the two PLL's are in constant phase alignment. In a single PLL design, the recovered clock on the receive side of the SERDES device is a phase aligned version of the transmit clock, and such unwanted interaction could occur if the phase aligner were faulty.

Figure 4:
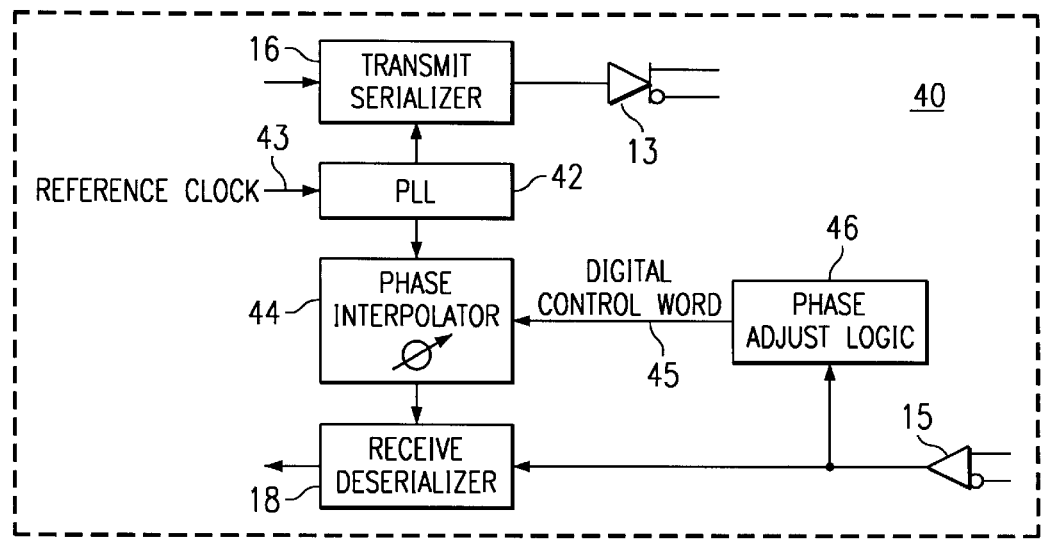
FIG. 4 is a simplified block diagram of a transceiver device with a single PLL.

FIG. 4 depicts a simplified block diagram of an exemplary SERDES design which uses a single analog PLL 42, with an input reference clock signal at 43, for the transmit function. This same high-speed transmit clock is used to derive a high speed clock that is locked to the received data stream using a phase interpolator 44. The phase interpolator 44 is an analog function responsive to a digital control word, at 45, which controls the amount of phase interpolation (phase shift) the phase interpolator 44 produces. Digital circuitry in the receive logic, i.e., phase adjust logic 46, detects how well the interpolated clock (phase-shifted clock) is aligned to the incoming data stream and adjusts the digital phase interpolator control word, at 45, accordingly to align the interpolated clock to the incoming data stream. This digital control forms a kind of digital locked loop in the receive circuitry.

Figure 5:
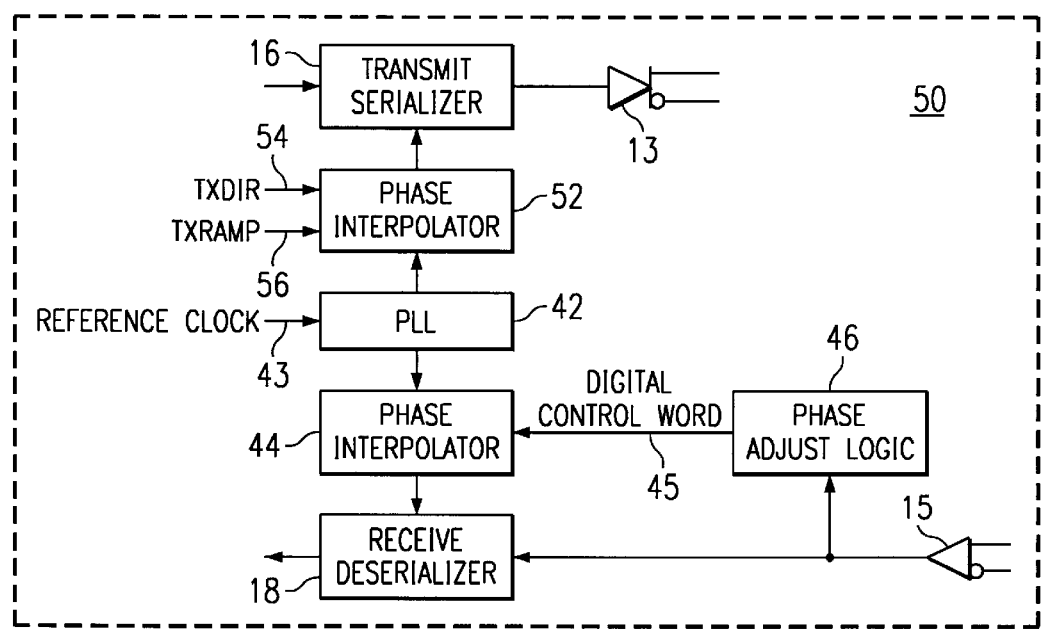
FIG. 5 shows a block diagram of a transceiver device with a single PLL and an additional phase interpolator.

FIG. 5 illustrates a simplified block diagram of an exemplary SRDES device 50 in which an additional phase interpolator 52 is added to the high speed transmit clock generated by the PLL 42. If the control word, not shown, associated with the additional phase interpolator 52 is set to a static, unchanging, value, then the operation of the exemplary SERDES device 50 remains unchanged.

But, if the control word associated with the additional phase interpolator 52 is slowly changed at a constant rate, this has the effect of adding a frequency offset to the transmit clock. As an example, assume that the control word associated with the additional phase interpolator 52 is adjusted on every fortieth ($40^{th}$) bit. In addition, assume that the control word associated with the additional phase interpolator 52 is adjusted by $$\frac{1^{th}}{64}$$

of a high-speed clock cycle (where the high speed clock cycle =the baud rate=the time to transmit 1 bit). Thus, the chosen frequency offset for purposes of illustration is $$\frac{1}{40} \times \frac{1}{64} = \frac{1}{2560} = 391 \text{ ppm.}$$

Thus, the exemplary SERDES device 50 offsets the transmit frequency by ±391 ppm, depending on the direction of the phase adjustment. This is useful for loopback testing.

During loopback testing in one embodiment of the exemplary SERDES device 50, a control pin on the device provides an input signal TXRAMP, at 56, which enables the transmit phase interpolator 52 to be slowly adjusted by a predetermined amount, i.e., 391 ppm. Another control pin provides an input signal TXDIR, at 54, which controls the direction of the adjustment, + or −, in either the internal loopback mode or external loopback mode. This forces the transmit data stream to be 391 ppm away from the frequency of the PLL 42. If the transmit data stream is looped back to the receive circuitry, this forces the receive circuitry to lock onto the data stream that is 391 ppm away from the PLL 42 speed. This forces the receive logic phase interpolator 44 to adjust to the frequency offset. In this way, the case where the exemplary SERDES device 50 must lock onto a data stream that is asynchronous to the transmit PLL 42 operation is simulated. For the exemplary SERDES device 50, a frequency offset that is nearly twice that allowed by the ANSI fibre channel standard specification (ANSI X3T11) is chosen.

Thus, by adding frequency offset to the transmit function, the exemplary SERDES device 50 is forced to operate in a loopback mode that more fully simulates actual system operation and will more fully test the functionality of the device under actual system conditions. Now loopback testing operates the exemplary SERDES device 50 in a mode where interaction between the transmit and receive functions can be exercised and observed. This enormously impacts the suitability of loopback for device testing in a production test environment, especially on production ATE where the test equipment is not capable of monitoring the high speed I/O signals directly and loopback must be used for device screening of functional/non-functional units.

During typical SERDES device 50 operation, the frequency offset control pin, which provides the input signal TXRAMP, at 56, is disabled, setting the transmit phase interpolator 52 control word to its predetermined static value resulting in no offset.

Figure 6:
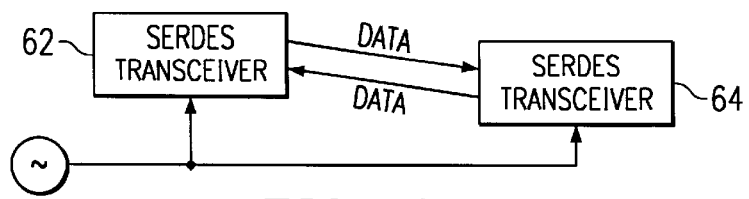
FIG. 6 illustrates a synchronous system with two serializer/deserializer devices.

The usefulness of the frequency offset is not limited to loopback testing. In synchronous systems where all SERDES devices are run off of a single synchronous clock source, as illustrated in FIG. 6, there may still be phase wander from one SERDES device 62 to another SERDES device 64.

In this instance, asserting a frequency offset on the transmit function of one SERDES device 62 tests the ability of the other SERDES device 64 to track phase or frequency wander.

Returning to FIG. 5, the function of the additional transmit phase interpolator 52 is also not limited to just introducing a frequency offset. By incrementing the phase control word slowly for a while, then slowly decrementing the phase control word, low frequency wander is simulated in a controlled manner for frequency wander tolerance testing.

Also, by incrementing the phase control word to a certain phase deviation away from normal, then resetting the phase control word, a sudden phase offset to the data stream is introduced. This is useful for probing the required data stream 'eye opening' at the receive deserializer function 18. Larger and larger phase offsets are introduced until errors are observed at the receive deserializer function 18, thus testing the jitter tolerance of the receive deserializer function 18.

It is noted that by offsetting the transmit baud rate by a fixed amount, it becomes necessary to provide data to the transmit serializer function 16 that is synchronous to the offset transmit frequency (divided by the serialization factor) and not to the reference clock, at 43. If transmit data is supplied relative to the reference clock, at 43, then eventually the transmit serializer function 16 is offset to a phase where the data to be transmitted no longer meets the setup/hold conditions of the transmit serializer function 16. To overcome this problem, another embodiment of the exemplary SERDES device 50 in accordance with the present invention uses a generator circuit, not shown, that provides a test data pattern, i.e., a known $2^7-1$ PRBS pattern to the transmit serializer function 16. This PRBS generator is not clocked by the reference clock, at 43, but is clocked by a clock that is also offset by the control word associated with the phase interpolator 52. This design detail might not be thought of upon initial consideration of how to implement the frequency offset.

The single PLL design with a digital locked receive loop is not the only type of SERDES device that can take advantage of the present invention.

Another device is a SERDES device that utilizes two independent PLLs, one for the transmit serializer function 16 and one for the receive deserializer function 18. The frequency offset phase interpolator 52 is still used on the transmit PLL, resulting in a transmit data stream that has a frequency which is offset by a positive (+) or negative (−) amount from the frequency provided from the transmit PLL. In this case, during the frequency offset operation during loopback, the receive PLL is forced to a certain frequency offset from the transmit PLL, and thus exposes any unwanted interaction between the two PLL's.

Thus, the frequency offset feature of the present invention is useful wherever there are SERDES devices that utilize loopback as a testing option.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. In an integrated circuit device including a data transmitter and a data receiver, the integrated circuit device comprising:

a clock source, having an output for a clock signal;

a phase locked loop, having an input connected to the output of the clock source, and having an output for providing a clock signal phase locked to a received signal and connected to the receiver for control of the timing of processing of the received data signal;

a phase interpolator having an input connected to the output of the clock source, having a control input for receiving control signals and adjusting the direction and rate of the phase interpolator in accordance with the control signals, and having an output providing a phase shifted clock signal and connected to the transmitter for control of the timing of processing of transmitted data signals.

2. An integrated circuit according to claim 1 wherein said phase locked loop comprises:

a second phase interpolator, having an input connected to the output of the clock source, having a control input for receiving a control word and adjusting the phase shift of the phase interpolator in accordance with the control word, and having an output providing a phase shifted clock signal and connected to the receiver for control of the timing of processing of received data signals; and phase detect logic for detecting the difference in phase between the received data signals and the shifted clock signal, and providing a control word corresponding to the detected phase shift to the control input of the phase interpolator, a method for testing the integrated circuit device.

3. In an integrated circuit device including a data transmitter and a data receiver, the integrated circuit device comprising a clock source, having an output for a clock signal;

a first phase interpolator, having an input connected to the output of the clock source, having a control input for receiving a control word and adjusting the phase shift of the phase interpolator in accordance with the control word, and having an output providing a phase shifted clock signal and connected to the receiver for control of the timing of processing of received data signals; and phase detect logic for detecting the difference in phase between the received data signals and the shifted clock signal, and providing a control word corresponding to the detected phase shift to the control input of the phase interpolator, a method for testing the integrated circuit device;

a second phase interpolator having an input connected to the output of the clock source, having a control input for receiving control signals and adjusting the direction and rate of the phase interpolator in accordance with the control signals, and having an output providing a phase shifted clock signal and connected to the transmitter for control of the timing of processing of transmitted data signals;

a method for testing the integrated circuit device comprising the steps of:

applying control signals to said second phase interpolator to control the phase shift of the second phase interpolator at a constant rate in a selected direction so as to create a constant frequency offset to the phase shifted clock signal; and measuring the response of the integrated circuit device to the effects of said control signals.

\* \* \* \* \*